United States Patent

[11] 3,576,426

[72] Inventor Walter Sesholtz
    Park Ridge, N.J.
[21] Appl. No. 771,036
[22] Filed Oct. 28, 1968
[45] Patented Apr. 27, 1971
[73] Assignee Sternco Industries, Inc.
    Harrison, N.J.

[54] THERMOSTATICALLY CONTROLLED ELECTRIC AQUARIUM WATER HEATER
3 Claims, 10 Drawing Figs.

[52] U.S. Cl. ................................................ 219/523,
    119/5, 200/84, 219/318, 219/331, 219/333,
    248/214
[51] Int. Cl. .................................................. H01k 63/02,
    H01h 36/02, H05b 3/06
[50] Field of Search .......................................... 219/523,
    318, 336, 331, 328, 327, 322, 437; 119/5;
    248/214, 215, 226, 226.5, 227; 200/84 (C), 84
    (R); 219/509, 333, 337, 308

[56] References Cited
UNITED STATES PATENTS

| 1,477,339 | 12/1923 | Forshee | 219/523X |
| 1,540,964 | 6/1925 | Trahan | 219/523 |
| 2,122,190 | 6/1938 | Wendt | 248/214 |
| 2,264,058 | 11/1941 | Vigren et al. | 200/84 |
| 2,524,261 | 10/1950 | Kaminky | 200/84 |
| 2,659,804 | 11/1953 | Dunn | 219/523 |
| 2,712,590 | 7/1955 | Doble | 219/523X |
| 2,736,791 | 2/1956 | Krah et al. | 219/523X |
| 2,740,881 | 4/1956 | Strokes | 219/322X |
| 3,319,049 | 5/1967 | Ulanet | 219/523 |
| 2,780,715 | 2/1957 | Strokes | 219/523X |
| 3,483,342 | 12/1969 | Mauro | 219/84(C) |

FOREIGN PATENTS

| 629,057 | 9/1949 | Great Britain | 219/337 |
| 415,641 | 10/1946 | Italy | 219/337 |
| 533,418 | 9/1955 | Italy | 219/523 |
| 142,097 | 11/1930 | Switzerland | 219/523 |
| 533,325 | 9/1931 | Germany | 219/337 |

Primary Examiner—A. Bartis
Attorney—Emanuel R. Posnack

ABSTRACT: A water heater for home aquariums, the device being adapted for partial immersion in the aquarium water. It comprises a casing the upper portion of which has a multiple-size bracket for attachment to the rim of a selected aquarium, the lower portion housing a thermostat-float switch assembly electrically connected to an electric heating element. The said lower portion is defined by an apertured shell serving both as a water-permeable housing the protective shield for the heater and its control components. The water to be heated enters the interior of the device for coaction with the heater components, thereby performing the heat-controlling operations itself by actuating a switch-operated float member. The device is adapted for attachment to aquariums of different rim thicknesses by said bracket which is of specially stepped construction.

Patented April 27, 1971
3,576,426
2 Sheets-Sheet 1
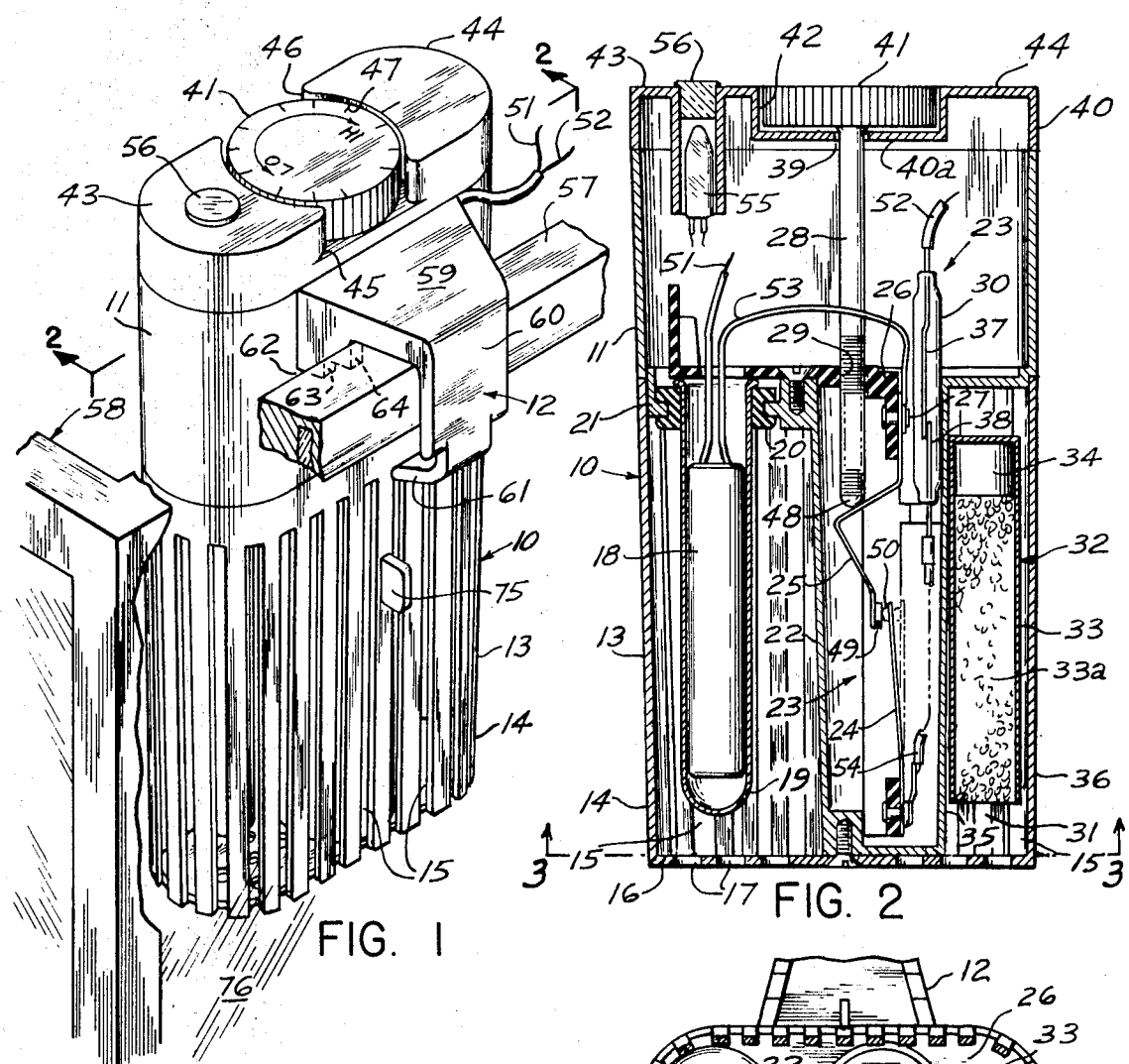
INVENTOR.
WALTER SESHOLTZ
BY
Attorney INVENTOR.
WALTER SESHOLTZ
BY
Attorney

THERMOSTATICALLY CONTROLLED ELECTRIC AQUARIUM WATER HEATER

BACKGROUND OF THE INVENTION

1. Field of the Invention

This invention relates to water heaters for home aquariums, and is particularly directed to an automatically controlled heater device preferably adapted for suspension from the rim of an aquarium for partial immersion in the aquarium water.

2. The Known Art

The heating of aquarium water by a submerged insulated electric heating element is a well-known expedient, but the commonly used devices of this category are generally subject to the danger of serious damage to the heating element in the event of a sudden emptying of the aquarium through leakage, or the accidental actuation of the heating element when the aquarium is empty. While thermostatic controls can regulate water temperature, they are not always effective in eliminating the said danger to the heating element by a timely opening of the circuit when the aquarium is empty. Moreover, thermostat controls, being relatively delicate instruments, are readily subject to damage or impairment of function by physical contact with adjacent objects, such as filter material, floating debris, water or air piping or other objects or gadgets often placed in home aquarium waters.

OBJECTIVES OF THE INVENTION

It is the objective of this invention to provide a compact, effective and automatic heat control and shutoff device having none of the above-mentioned shortcomings. More specifically, among the objects of this invention are the provision of heater switch means automatically operable by the aquarium water which is to be heated, and which enables said water to effect an immediate cutting off of the heater circuit when the water volume is below a predetermined amount, thereby to remove the danger of damage to the heater element; the provision of supplementary thermostat switch control means for controlling the water temperature; the provision of means to shield said heater and switch components against damage while permitting aquarium water to come into operative engagement with said members; the provision of readily accessible manual control means for said thermostat switch means; the provision of conveniently located signal means to indicate whether or not the heating element is operating; and the provision of means to enable the device to be operatively attached to aquariums of various rim thicknesses.

Other objects, features and advantages will appear from the drawings and the description hereinafter given.

SUMMARY OF THE INVENTION

The preferred embodiment of this invention comprises a casing the upper portion of which has a bracket for attachment to the rim of an aquarium, the lower portion, constituting part of the outer casing wall, comprising a water-permeable housing within which is contained heater means comprising a thermostat-float switch and electric heater assembly. Said housing portion, defined by an apertured shell, is adapted to be immersed in the aquarium water, whereby the water is free to enter the interior of the device into operative relation with the components of said assembly, the housing serving at the same time as a protective shield for said components.

The said heater means comprises an encased electric heater element electrically connected in series to a circuit containing a bimetallic thermostat switch member and a magnetic reed switch positioned for actuation by a magnetic element mounted on a float member floatable in the water within said casing. Only when said float member is above a predetermined level will said magnetic element close said reed switch, the arrangement being such that said thermostat and magnetic reed switches must both be closed to put the electric heating element into operation. Operatively connected to said thermostat switch is a control knob positioned for easy access in the top wall of the casing, a light indicator also being positioned in said top wall, said indicator comprising a window overlying a lamp electrically connected to the heater circuit.

The bracket attached to the upper portion of the casing has a special stepped construction with preferably flexible portions enabling the casing to be mounted on aquariums of different rim thicknesses.

DESCRIPTION OF THE DRAWINGS

FIG. 1 is a perspective view of the aquarium water heater of this invention shown mounted upon the upper rim of an aquarium tank and positioned within the tank.

FIG. 2 is a vertical section of the heater taken substantially along line 2–2 of FIG. 1, the thermostat float switch being shown in closed position, the dot-dash lines showing the thermostat contact arms in open noncontacting positions.

FIG. 3 is a fragmentary section of FIG. 2 taken substantially along line 3–3.

FIG. 4 is a fragmentary bottom view of said heater.

FIG. 5 is a fragmentary semidiagrammatic view of the thermostat float switch and float of FIG. 2 when in open position.

DESCRIPTION OF PREFERRED EMBODIMENT

Figure 6:
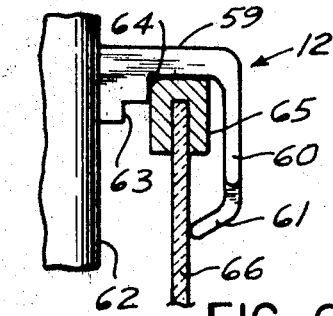
FIGS. 6, 7, 8 and 9 are side views of the upper bracket portion of the heater shown mounted on aquarium rims of different thicknesses.

The embodiment of this invention illustrated in FIGS. 1 to 5 comprises a casing 10 with an upper portion 11 supporting the bracket 12, and apertured lower portion 13 serving as a water-permeable housing and protective shield for the heater component and thermostat-float switch to be hereinafter described. The said lower shield 13, in the particular form shown, has a lateral wall 14 of substantially elliptical cross section with parallel vertical slots 15 and a base 16 with apertured portions 17, whereby water will be able to flow into the interior of the device for coaction with the components contained therein when the said lower portion 13 is immersed in the aquarium water.

An electric heating component 18 of conventional construction is disposed within the tube 19 of heat-conducting material, said tube being suspended from the grommet 20 which is supported by the wall 21 at the top of said shield portion 13. Disposed within the compartment 22 is a thermostat-float switch generally designated 23 comprising a bimetallic contact arm 24, a coacting adjustable contact arm 25 mounted on the thermostat bracket 26 at the terminal connection 27 thereof, an adjusting screw 28 in threaded engagement with the threaded apertured portion 29 of said bracket 26, and a conventional magnetic reed switch 30.

Positioned within the lateral section 31 of said lower casing section 13 is the magnetic float member 32 comprising the tube 33, the magnetic element 34 at the upper portion thereof and suitable light flotation material 33a such as "styrofoam." The said tube 33 is positioned between the interior wall 35 and the outer wall 36, and is slidable vertically therealong during the operative floating movement of said member 32. The said magnetic element 34 is so positioned and proportioned as to be in operative adjacent relation to the contact arms 37 and 38 of said magnetic reed switch 30 when the float member 32 is elevated by water at predetermined levels within the lower shield portion 13 of casing 10, and is in nonoperative relation to said contact arms at lower levels of said water. The said contact arms 37 and 38 are normally yieldably separated, and are adapted to be brought into contact under the magnetic influence of the magnetic element 34, in known manner.

The shank of said adjusting screw 28 extends upwardly through the aperture 39 in the depressed wall portion 40a of the top section 40 of the said casing 11, said screw carrying the knob 41 positioned within the well 42 defined by the laterally opposite sections 43 and 44 of said top section 40, the respective front and rear portions 45 and 46 of said top section being open to permit manual rotary manipulation of said knob 41. Calibration markings 47 on the top of said knob indicate different temperature settings of the thermostat for different positions of the knob. The bottom terminal 48 of the said screw 28 is in abutting engagement with the angular spring loaded thermostat contact arm 25, the position of contact element 49 with respect to the coacting contact element 50 being dependent upon the selected position of said knob 41.

A detailed description of said thermostat switch construction is not deemed necessary for the purpose of this specification, since it is well known to those skilled in the art. Suffice it to say that at a predetermined temperature, the bimetallic contact arm 24 will be operatively bent a sufficient amount to bring its contact element 50 into engagement with said coactive contact element 49 to close the circuit if the said magnetic reed elements 37 and 38 are also in contact, such contact being effected when the magnetic element 34 is at an upper operative level and the magnetic reed elements are under the operative magnetic influence of the magnetic element 34. FIG. 2 illustrates the closed position of the switch in full lines. The electrical connections comprise the conductors 51 and 52 extending from a wall outlet (not shown) and connected, respectively, to the heating element 18 and the arm 37 of the magnetic reed switch 30; the lead 53 extending from said heating element to the said terminal 27, and the conductor 54 electrically joining the bimetallic arm 24 and the magnetic reed arm 38. The lamp 55 is connected in parallel to the circuit in known manner, so that it will show when the switch is operatively closed and the water is being heated. In the embodiment illustrated the transparent member 56 fitted into the wall of section 43 serves to cover the lamp.

When this device is operatively mounted on the rim 57 of the aquarium tank 58, with the casing 10 positioned within the tank and the said lower shield portion 13 thereof immersed in water, the water will enter the interior of said shield portion through the said apertured portions 15 and 17, the said heating, switch and float components being protected against manual contact and engagement with outside objects by the wall 14 and base 16. Should there be no water in the tank, or should the water be below a predetermined level, the said float member 32 will be at the low level shown in FIG. 5, whereby the magnetic element 34 will be in its nonoperative position, so that the circuit through the heating element will be open, even if the thermostat contacts 49 and 50 are closed. Only when the water in the tank is at the predetermined level at which the magnetic element 34 will close said reed contacts 37 and 38 can the heating element 18 be brought into operation, provided the temperature is below that set by the thermostat knob 41.

The device thus enables the aquarium water which is to be heated to perform the heat controlling operations itself. Once the thermostat knob 41 is set, the aquarium water will, by the amount of water within the tank and its level within the casing 10, determine when the heat is to be turned on or off. In this way not only is the water temperature controlled, but the danger of current flowing through the heating element is also obviated when there is no water in the aquarium, or when the water is below a safe level.

The construction is compact for manual handling, is protective of the delicate heating, switch and float members while permitting aquarium water operatively to coact with such members, enables easy access to the thermostat control knob, and indicates at a convenient spot whether or not the heater is operating. And it is provided with a bracket 12 which can readily be mounted on aquarium rims of various thicknesses. In the embodiment shown, the bracket 12 is adapted to coact with the outwardly extending abutment member 75, said member being engageable with the inner surface of the glass wall 76 of the aquarium, the inwardly extending finger 61 of the bracket 12 being engageable with the outer surface of said glass wall.

Figure 7:
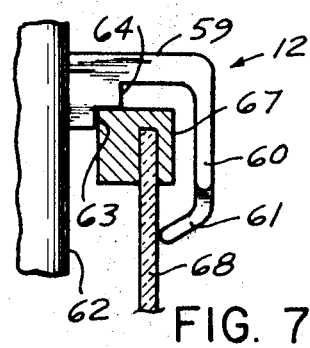
Figure 8:
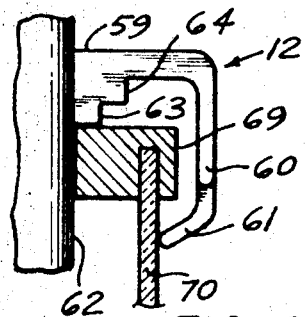
Figure 9:
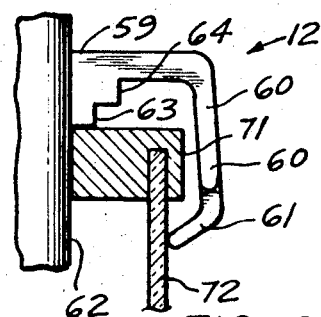

The said bracket 12 comprises an outwardly extending arm 59 and a downwardly extending flexible arm 60 with an inwardly extending finger 61. The lower portion of said arm 59 is of upwardly and outwardly stepped configuration, providing a plurality of vertical walls 62, 63 and 64 for coaction with the said finger 61 for firm engagement with the tops of aquariums of different rim sizes. FIG. 6 illustrates a relatively thin rim 65 engaging the wall 64, the finger 61 engaging the aquarium glass wall 66. FIG. 7 shows the somewhat thicker rim 67 engaging the wall 63, while the finger 61 is in engagement with the aquarium wall 68. FIG. 8 illustrates a still thicker rim 69 engaging the wall 62 and the finger 61 engaging the aquarium wall 70. And FIG. 9 illustrates the relatively thick rim 71 engaging the wall 62 while the arm 60 is flexed outwardly and its finger 61 is in engagement with the aquarium wall 72.

Figure 10:
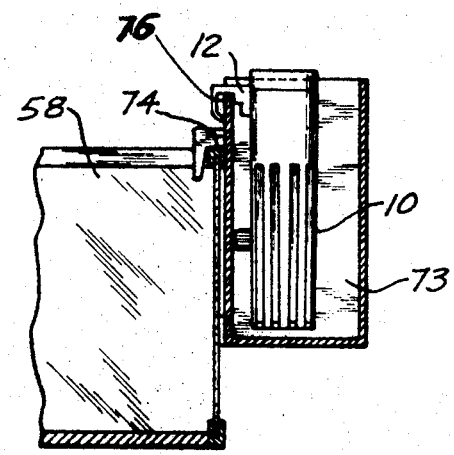
FIG. 10 is a fragmentary part sectional and part elevational side view of the heater device of this invention positioned within a filter unit mounted on the outside of an aquarium tank.

The heater device is adapted not only to be mounted within an aquarium tank as illustrated in FIG. 1, but also outside of a tank as shown in FIG. 10. This FIG. shows an outside filter chamber 73 operatively mounted on the rim of the aquarium tank 74 with the filter chamber disposed outside of the tank in known manner. In this arrangement the casing 10 of this invention is disposed within said filter chamber 73 which contains filtered water, the bracket 12 being operatively mounted on the wall 75. The controlled heating action with this arrangement is identical with that of the inside arrangement above described.

In the above description, the invention has been disclosed merely by way of example and in preferred manner; but obviously many variations and modifications may be made therein. It is to be understood, therefore, that the invention is not limited to any form or manner of practicing same, except insofar as such limitations are specified in the appended claims.

I claim:

1. An aquarium water heater comprising a casing and electric water heating means disposed within said casing, said casing being in shielding relation to said water heating means and having an apertured portion for the passage of aquarium water into and out of said casing, said water heating means being in communication with said apertured portion, said heating means having an electric heating element, a magnetic reed switch in series with said heating element, and a float member positioned within said casing and adapted to be floatably supported by water operatively within said casing, said float member carrying a magnetic element adapted for operative coaction with said magnetic reed switch to close it when said float member is operatively positioned at predetermined levels of water within the casing, and being in nonoperative relation to said reed switch at lower levels of said water, said heating means having a thermostat switch in series with said electric heating element and said reed switch, said reed switch being disposed laterally of said float member, said thermostat switch having an operatively connected control knob disposed at the top portion of the casing, said casing having therein a transverse wall, said heating element being supportably suspended from said latter wall, said casing also having a compartment disposed laterally with respect to said heating element, said thermostat switch and reed switch being disposed in said compartment, said thermostat switch having a shaft in threaded engagement with said transverse wall, the top of said shaft carrying said knob.

2. An aquarium water heater comprising a casing and electric water heating means disposed within said casing, said casing being in shielding relation to said water heating means and having an apertured portion for the passage of aquarium water into and out of said casing, said water heating means being in communication with said apertured portion, the upper part of said casing having a bracket for attachment to the rim of an operatively adjacent aquarium, said bracket comprising an outwardly extending arm, a downwardly extending arm joined to said latter arm, and an inwardly extending finger joined to said downwardly extending arm, the underside of said outwardly extending arm being of upwardly and outwardly stepped configuration and providing at each stepped portion a substantially vertical wall, said walls being above said finger and in coactive relation therewith for operative engagement with differently proportioned aquarium rims and walls, respectively.

3. An aquarium water heater according to claim 2, at least one of said arms being flexible.